US008974005B2

(12) United States Patent
Mason et al.

(10) Patent No.: US 8,974,005 B2
(45) Date of Patent: Mar. 10, 2015

(54) CHILD RESTRAINT HARNESS HAVING A CHEST CLIP DEVICE

(71) Applicant: BP Children's Products HK Co., Limited, Kwun Tong, Kowloon (HK)

(72) Inventors: Kyle S. Mason, Reading, PA (US); James M. F. Hutchinson, Mohnton, PA (US)

(73) Assignee: BP Children's Products HK Co., Ltd., Hong Kong (HK)

( * ) Notice: Subject to any disclaimer, the term of this patent is extended or adjusted under 35 U.S.C. 154(b) by 88 days.

(21) Appl. No.: 13/652,525

(22) Filed: Oct. 16, 2012

(65) Prior Publication Data

US 2014/0103697 A1  Apr. 17, 2014

(51) Int. Cl.
*B60R 21/00* (2006.01)
*A44B 11/25* (2006.01)
*B60R 22/10* (2006.01)
*B60N 2/28* (2006.01)

(52) U.S. Cl.
CPC .......... *A44B 11/2546* (2013.01); *B60R 22/105* (2013.01); *B60N 2/2812* (2013.01)
USPC ............. 297/484; 297/463.2; 24/614; 24/629

(58) Field of Classification Search
CPC ......................... A44B 11/2546; B60R 22/105
USPC ............ 297/484; 24/633, 614, 629; 224/258, 224/259, 631, 638, 262, 190, 578, 260, 278, 224/604, 907, 648; 2/336; 450/86
See application file for complete search history.

(56) References Cited

U.S. PATENT DOCUMENTS

| 722,304 | A * | 3/1903 | Hull .................................. 54/21 |
| 5,429,287 | A * | 7/1995 | Frano ............................ 224/640 |
| 6,662,413 | B2 * | 12/2003 | Glover ............................ 24/615 |
| 7,707,698 | B2 * | 5/2010 | Gardner ....................... 24/697.1 |
| 8,333,433 | B2 * | 12/2012 | Friedman ...................... 297/482 |
| 2008/0295304 | A1 | 12/2008 | Gardner |
| 2011/0193396 | A1 | 8/2011 | Friedman |

* cited by examiner

*Primary Examiner* — David R Dunn
*Assistant Examiner* — Jody Giacoman
(74) *Attorney, Agent, or Firm* — David I. Roche; Baker & McKenzie LLP

(57) ABSTRACT

A child restraint harness includes first and second shoulder straps, a first chest clip connector held with the first shoulder strap and having an engaging part, and a second chest clip connector held with the second shoulder strap and having a catch structure. The engaging part is operable to engage and lock with the catch structure selectively at a first position to hold the first and second shoulder straps apart from each other at a first distance, and at a second position to hold the first and second shoulder straps apart from each other at a second distance greater than the first distance.

22 Claims, 5 Drawing Sheets

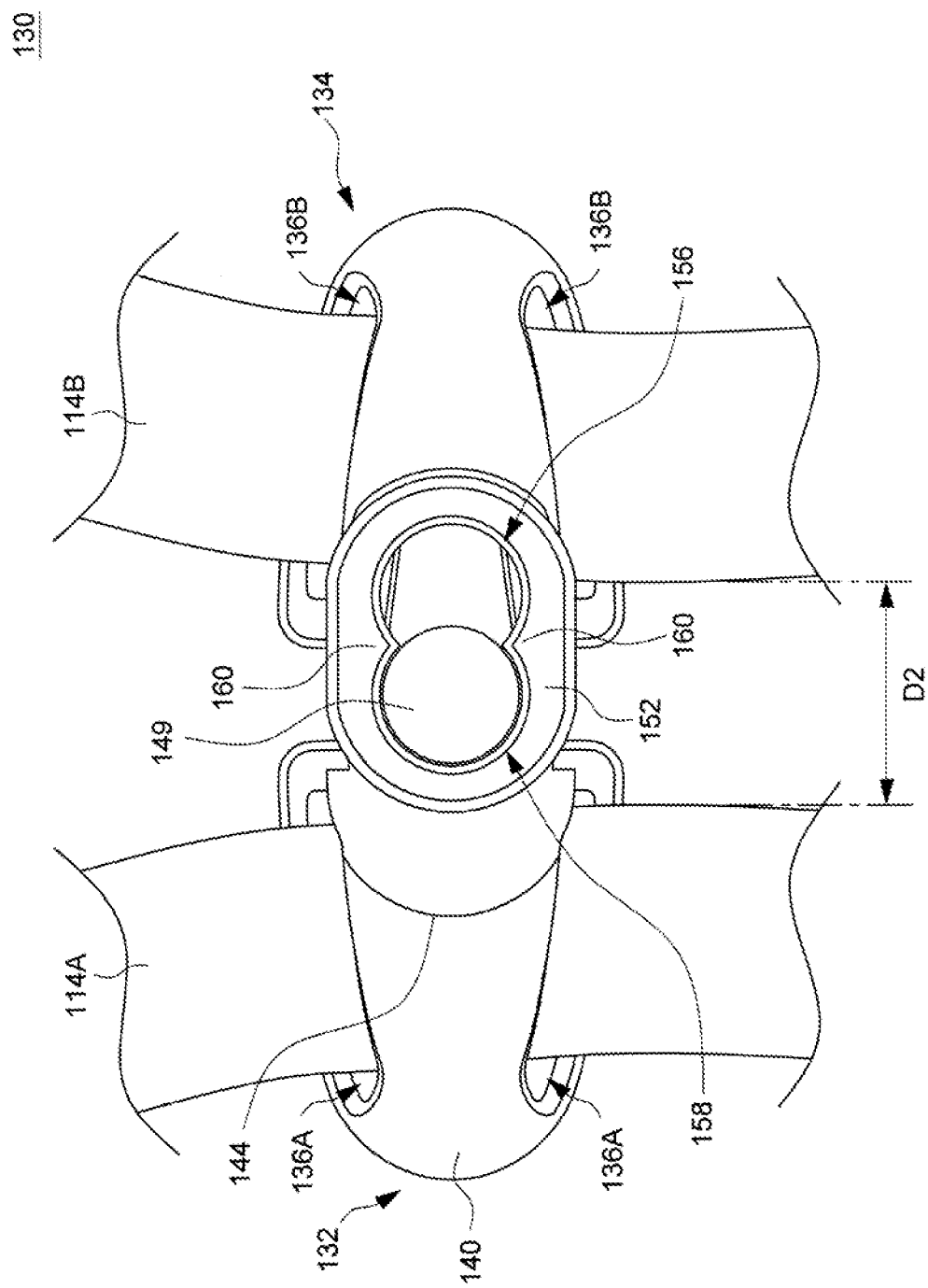

CHILD RESTRAINT HARNESS HAVING A CHEST CLIP DEVICE

CROSS-REFERENCE TO RELATED APPLICATION

This application claims priority to U.S. Provisional Patent Application No. 61/627,832, which was filed on Oct. 18, 2011.

BACKGROUND

1. Field of the Invention

The present inventions relate to child restraint harnesses provided with chest clips.

2. Description of the Related Art

Child safety seats generally include an internal child restraint harness. The child restraint harness includes a chest clip used to keep the shoulder straps in the correct position on the shoulder of the child. A problem with the current chest clip is that it may not be able to accommodate children of different sizes. Therefore, there is a need for a chest clip that can be suitable for children of different sizes, and address at least the foregoing issues.

SUMMARY

The present application describes a child restraint harness having a chest clip device. The child restraint harness includes first and second shoulder straps, a first chest clip connector held with the first shoulder strap and having an engaging part, and a second chest clip connector held with the second shoulder strap and having a catch structure. The engaging part is operable to engage and lock with the catch structure selectively at a first position to hold the first and second shoulder straps apart from each other at a first distance, and at a second position to hold the first and second shoulder straps apart from each other at a second distance greater than the first distance.

BRIEF DESCRIPTION OF THE DRAWINGS

FIG. 5 is a schematic view illustrating the chest clip device attached in a second configuration.

DETAILED DESCRIPTION OF THE EMBODIMENTS

Figure 1:
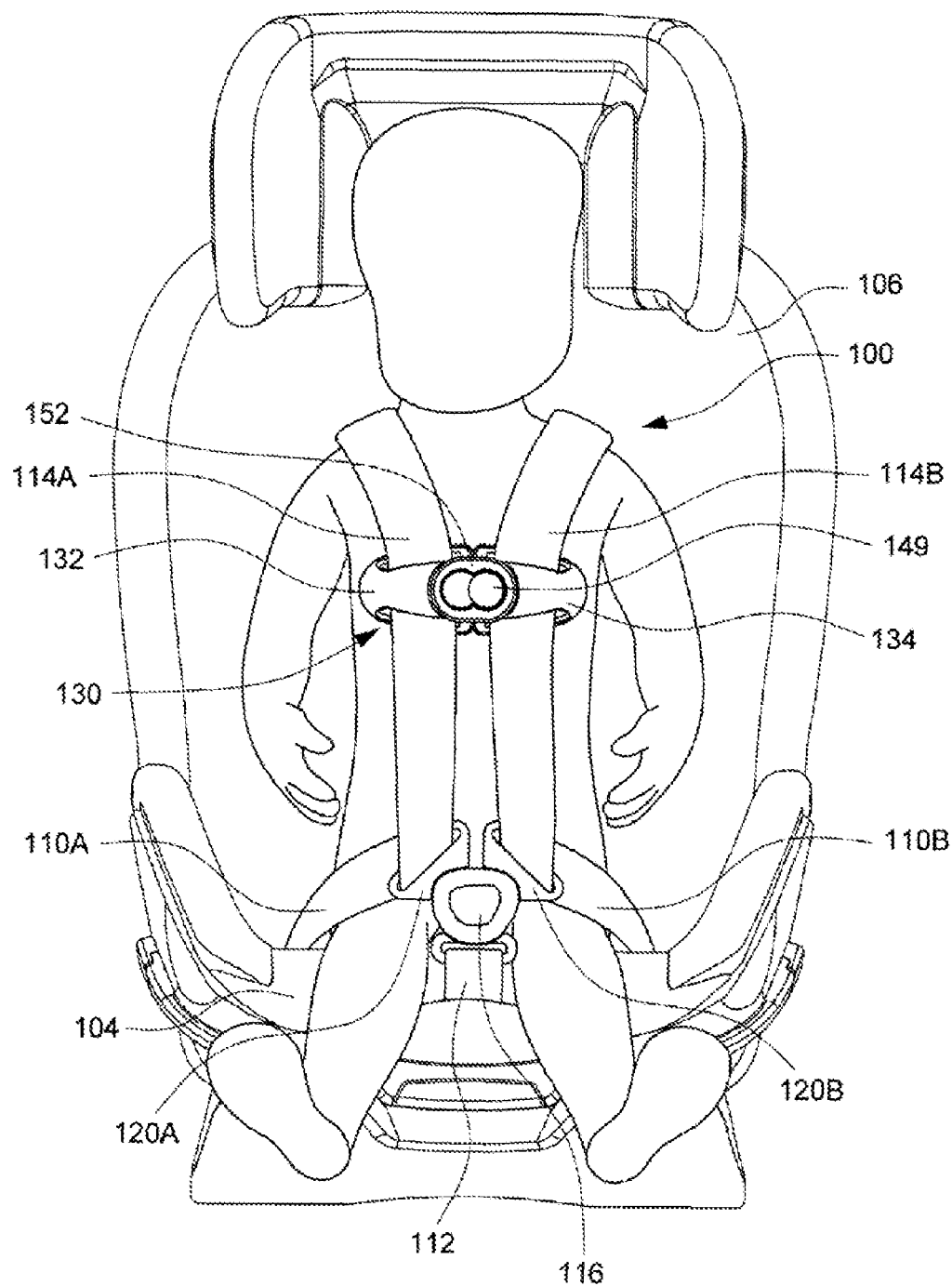
FIG. 1 is a schematic view illustrating an embodiment of a child restraint harness.

FIG. 1 is a schematic view illustrating an embodiment of a child restraint harness 100. The child restraint harness 100 may be provided on a child seat 102 having a seat portion 104 and a seatback 106. Examples of the child seat 102 can include child safety seats installed in a vehicle for seating a child. The child restraint harness 100 can include waist straps 110A and 110B, a crotch strap 112, shoulder straps 114A and 114B, and a fastening buckle 116 held with the crotch strap 112. In one embodiment, the child restraint harness 100 can implement a three-point attachment including two fasteners 120A and 120B operable to engage and lock with the buckle 116. The two fasteners 120A and 120B can include a right fastener 120A connected with the right waist strap 110A and the right shoulder strap 114A, and a left fastener 120B connected with the left waist strap 110B and the left shoulder strap 114B. "Left" and "right" as used herein can refer to the two lateral sides of the child. In one embodiment, the right waist strap 110A and the right shoulder strap 114A can be formed from a same continuous web material that is routed through the right fastener 120A, and the left waist strap 110B and the left shoulder strap 114B can be formed from another continuous web material that is routed through the left fastener 120B. Each of the fasteners 120A and 120B can include a tongue portion adapted to engage through the buckle 116. In addition, the child restraint harness 100 can include a chest clip device 130 operable to properly position the two shoulder straps 114A and 114B.

Figure 2:
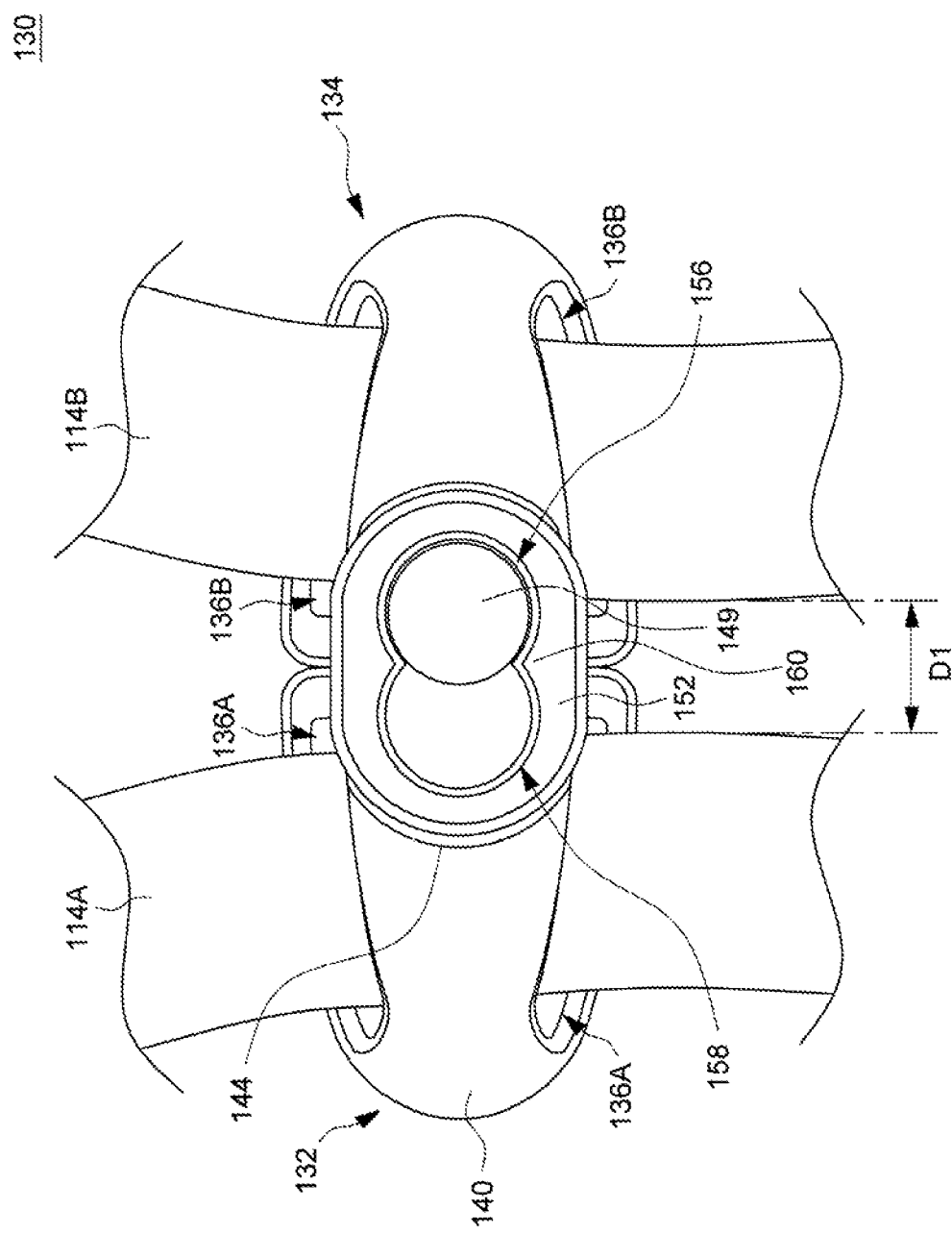
FIG. 2 is a partially enlarged view illustrating the chest clip device attached in a first configuration.
Figure 3:
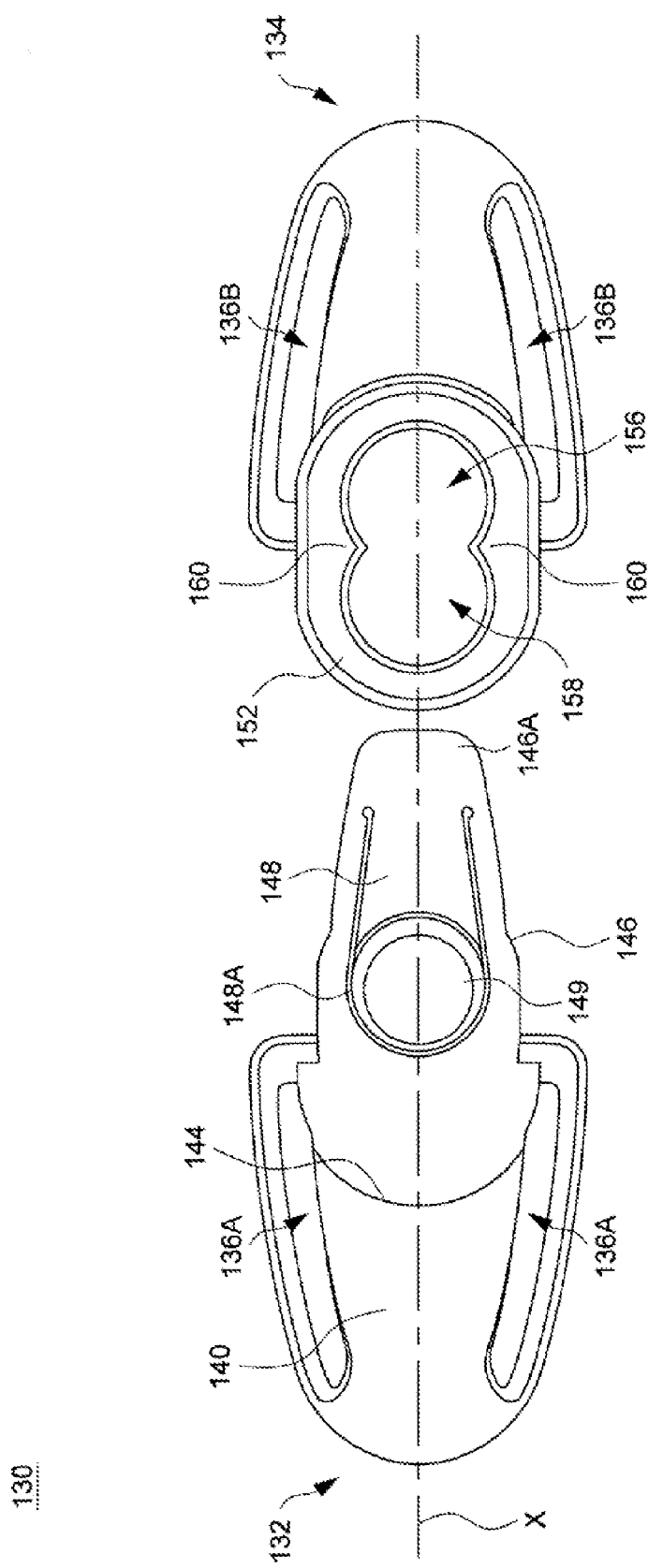
FIG. 3 is a schematic view illustrating the chest clip device in a detached state.
Figure 4:
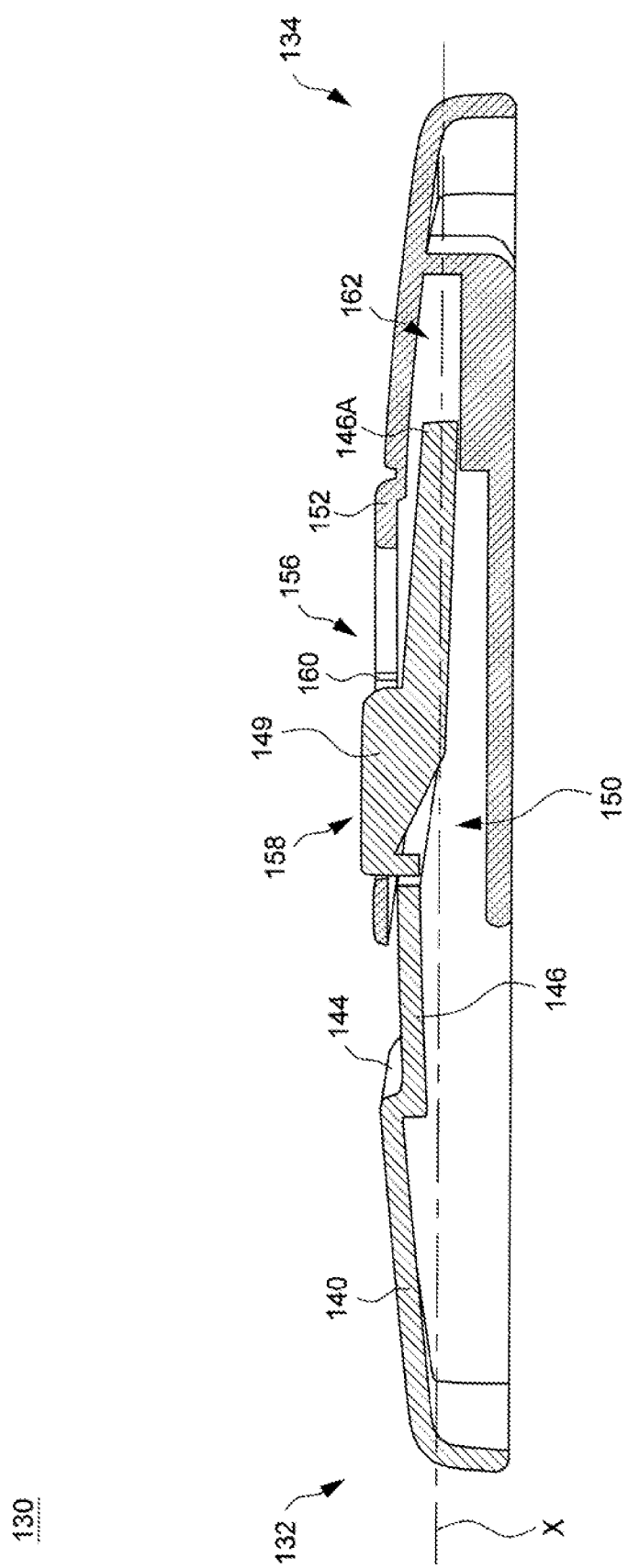
FIG. 4 is a cross-sectional view of the chest clip device.

In conjunction with FIG. 1, FIG. 2 is a partially enlarged view illustrating the chest clip device 130, FIG. 3 is a schematic view illustrating the chest clip device 130 in a detached state, and FIG. 4 is a cross-sectional view of the chest clip device 130. The chest clip device 130 can include a first chest clip connector 132 held with a first shoulder strap (e.g., the shoulder strap 114A), and a second chest clip connector 134 held with a second shoulder strap (e.g., the shoulder strap 114B). It would be appreciated that the arrangement of the connectors 132 and 134 can be mutually interchanged on the shoulder straps 114A and 114B. The chest clip connectors 132 and 134 can engage and lock with each other at different positions so as to set a desirable width of the chest clip device 130 (i.e., a transversal distance between a first point on the chest clip connector 132 and an opposite point on the chest clip connector 134). The multiple positions for attaching the chest clip connectors 132 and 134 can allow to set different distances between the shoulder straps 114A and 114B. Each of the chest clip connectors 132 and 134 can be provided with slots 136A and 136B through which the associated shoulder straps 114A and 114B can be routed vertically and held with the connectors.

Referring to FIGS. 3 and 4, the chest clip connector 132 can include a tab portion 140 having a recessed portion that forms a tongue 146. A proximal end of the recessed portion (i.e., closer to the slots 136 where the shoulder straps 114A are routed) can be defined by a sidewall 144. The tongue 146 can include a resilient engaging part 148 that is connected with the tongue 146 near a distal end 146A of the tongue 146 (i.e., distal from the shoulder straps 114A). The engaging part 148 can have a free end 148A located at a middle region of the tongue 146 between the sidewall 144 and the distal end 146A of the tongue 146. The free end 148A of the engaging part 148 can be provided with a protruding knob 149. The knob 149 can exemplary have a circular shape, but any shapes may be applicable. The chest clip connector 132 comprised of the tab portion 140, the tongue 146, the engaging part 148 and the knob 149 can be formed integrally in a single body by plastics molding. The slots 136A can be formed at two sides of the tab portion 140 through which the shoulder strap 114A can be routed to wrap around the tab portion 140. Accordingly, the chest clip connector 132 can be movably adjusted along the shoulder strap 114A.

The chest clip connector 134 can include a hollow interior forming an insert slot 150 in which the tongue 146 of the chest clip connector 132 can insert along a displacement axis X. The chest clip connector 134 can be formed with a catch structure 152 with which the engaging part 148 can engage and lock at different positions. The catch structure 152 can extend as a sidewall of the insert slot 150, and include two openings 156 and 158 distributed along the axis X and communicating with the insert slot 150. The shape of the openings 156 and 158 can be configured to complementary mate with that of the knob 149, such as a circular shape as shown. However, any other shapes may be suitable. The openings 156 and 158 are shown sideways connected with each other along the axis X, ridges 160 being interposed between the openings 156 and 158. In alternate embodiments, the openings 156 and 158 may also be entirely disconnected from each other. The chest clip connector 134 comprised of the catch structure 152 can be formed integrally in a single body by plastics molding.

Exemplary operation of the chest clip device 130 is described hereafter with reference to FIGS. 1-5. After the child is attached with the child restraint harness 100, the chest clip connectors 132 and 134 can be vertically adjusted to a suitable height approximately corresponding to the level of the child's armpits. The tongue 146 of the chest clip connector 132 then can be inserted along the axis X into the insert slot 150 of the chest clip connector 134 until the knob 149 engages and locks with any of the openings 156 and 158 by elastic deflection of the engaging part 148 in a direction substantially perpendicular to the axis X.

For example, should the child have a smaller body, the tongue 146 can be inserted into the insert slot 150 until the knob 149 engages and locks with the opening 156 of the catch structure 152 and the catch structure 152 abuts against or is positioned substantially adjacent to the sidewall 144. As shown in FIGS. 1 and 2, the locking engagement of the chest clip connector 132 at this first position of the chest clip connector 134 can allow the chest clip device 130 to hold the two shoulder straps 114A and 114B apart from each other at a narrower first distance D1. In the embodiment where the openings 156 and 158 are sideways connected with each other, the ridges 160 can retain the knob 149 engaged with the opening 156 and prevent it from moving into the opening 158.

Should the child have a larger body, the knob 149 can engage and lock with the opening 158 of the catch structure 152 such that the catch structure 152 is positioned farther away from the sidewall 144. As shown in FIG. 5, the locking engagement of the chest clip connector 132 at this second position of the chest clip connector 134 can allow the chest clip device 130 to hold the two shoulder straps 114A and 114B apart from each other at a distance D2 greater than the distance D1.

Referring to FIG. 4, an end of the insert slot 150 may form a narrow passage 162 that has at least a dimension (e.g., height) smaller than the insert slot 150. The length of the tongue 146 may be such that the distal end 146A of the tongue 146 can remain engaged in the passage 162 regardless of whether the knob 149 is locked with any of the openings 156 and 158. Since the connector 132 can engage with the connector 134 through at least two spaced-apart locations, i.e., engagement of the distal end 146A with the passage 162 and engagement of the knob 149 with the catch structure 152, secure attachment of the chest clip device 130 can be provided.

To unlock the chest clip device 130, the knob 149 exposed through the opening 156 or 158 can be depressed so as to disengage from the opening 156 or 158. Being unlocked, the chest clip connector 132 then can be removed from the chest clip connector 134, or adjusted to set a desirable distance between the shoulder straps 114A and 114B.

It is appreciated that modifications of the principles of design described herein may be possible. For example, in the illustrated embodiment, the engaging part 148 is exemplary shown as deflecting back and forth to engage and disengage the catch structure 152. In alternate embodiments, the engaging part and the catch structure may be disposed such that the engaging part can deflect vertically up and down to engage and disengage the catch structure. This may be achieved by changing the engaging part and the catch structure to an up/down relationship, which may be arranged at an upper and/or lower location of the connectors 132 and 134.

At least one advantage of the child restraint harness described herein is the ability to provide a chest clip device 130 that can be able to hold the shoulder straps 114A and 114B apart from each other at different distances according to the size of the child.

Realizations of the child restraint harness have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the inventions as defined in the claims that follow.

What is claimed is:

1. A child restraint harness comprising:
   first and second shoulder straps;
   a first chest clip connector held with the first shoulder strap and having an engaging part the first shoulder strap passing through the first chest clip connector; and
   a second chest clip connector held with the second shoulder strap and having a catch structure, the second shoulder strap passing through the second chest clip connector, the engaging part being operable to engage and lock with the catch structure selectively at a first position to hold the first and second shoulder straps apart from each other at a first distance, and at a second position to hold the first and second shoulder straps apart from each other at a second distance greater than the first distance.

2. The child restraint harness according to claim 1, wherein the second chest clip connector includes an insert slot, and the first chest clip connector is movable to insert into the insert slot.

3. The child restraint harness according to claim 1, wherein the catch structure includes at least two openings respectively corresponding to the first and second positions, the engaging part having a knob adapted to engage with any of the two openings.

4. The child restraint harness according to claim 3, wherein the two openings are sideways connected with each other.

5. The child restraint harness according to claim 1, wherein the second chest clip connector includes an insert slot located at one side of the catch structure, the first chest clip connector includes a tongue, and the tongue is adapted to insert through the insert slot until the engaging part engages with the catch structure.

6. The child restraint harness according to claim 5, wherein the engaging part is connected with the tongue near a distal end of the tongue, and has a free end located at a middle region of the tongue, the free end of the engaging part being adapted to engage with the catch structure.

7. The child restraint harness according to claim 6, wherein the catch structure includes at least two openings respectively corresponding to the first and second positions, the free end of the engaging part has a knob adapted to engage with any of the two openings.

8. The child restraint harness according to claim 7, wherein the first chest clip connector comprised of the engaging part, the tongue and the knob is formed integrally in a single body.

9. The child restraint harness according to claim 7, wherein the tongue has a distal end that engages with a narrow passage of the insert slot when the knob engages with any of the two openings.

10. A child safety seat including the child restraint harness according to claim 1.

11. A chest clip device suitable for use with a child restraint harness, the chest clip device comprising:
a first chest clip connector having an engaging part and a tongue, the engaging part being connected with the tongue near a distal end of the tongue and having a free end located at a middle region of the tongue; and
a second chest clip connector having a catch structure and an insert slot, the tongue being operable to insert through the insert slot until the free end of the engaging part engages and locks with the catch structure selectively at any of a first and a second position.

12. The chest clip device according to claim 11, wherein the first chest clip connector and the second chest clip connector are movable along a displacement axis to engage with each other, and the first and second positions are spaced apart from each other along the displacement axis.

13. The chest clip device according to claim 11, wherein the second chest clip connector includes an insert slot, and the first chest clip connector is movable along a displacement axis to insert into the insert slot, the first and second positions being distributed along the displacement axis of the first chest clip connector.

14. The chest clip device according to claim 11, wherein the catch structure includes at least two openings respectively corresponding to the first and second positions, and the engaging part has a knob adapted to engage with any of the two openings.

15. The chest clip device according to claim 14, wherein the two openings are sideways connected with each other.

16. The chest clip device according to claim 11, wherein the catch structure includes at least two openings respectively corresponding to the first and second positions, the free end of the engaging part having a knob adapted to engage with any of the two openings.

17. The chest clip device according to claim 16, wherein the first chest clip connector comprised of the engaging part, the tongue and the knob is formed integrally in a single body.

18. The chest clip device according to claim 16, wherein the tongue has a distal end that engages with a narrow passage of the insert slot when the knob engages with any of the two openings.

19. A chest clip device suitable for use with a child restraint harness, the chest clip device comprising:
a first chest clip connector having an engaging part; and
a second chest clip connector having a catch structure, the first and second chest clip connectors being movable along a displacement axis to lock with each other, the catch structure defining at least a first and a second region disposed along the displacement axis, and the engaging part being operable to selectively engage with any of the first and second regions of the catch structure, wherein engagement of the engaging part with either of the first and second regions locks the connectors together and blocks movement of the engaging part relative to the second chest clip connector in two opposite directions along the displacement axis.

20. The chest child clip device according to claim 19, wherein the first and second regions include openings, and the engaging part is adapted to engage with any of the openings.

21. The chest clip device according to claim 19, wherein the engaging part is elastically deflectable substantially perpendicular to the displacement axis.

22. The chest clip device according to claim 19, wherein the first chest clip connector includes a first slot for passage of a first strap along a first direction substantially perpendicular to the displacement axis, and the second chest clip connector includes a second slot for passage of a second strap along a second direction substantially perpendicular to the displacement axis.

* * * * *